United States Patent [19]

Auckland et al.

[11] 3,994,162
[45] Nov. 30, 1976

[54] YARN TENSION MEASURING

[76] Inventors: David William Auckland, 44 Longdown Road, West Heath, Congleton; Nicholas Paul Lutte, 26 Agnes Court, Wilmslow Road, Withington, Manchester 20, both of England

[22] Filed: Oct. 2, 1975

[21] Appl. No.: 618,767

[52] U.S. Cl. .................................................. 73/144
[51] Int. Cl.² ........................................... G01L 5/10
[58] Field of Search............ 73/144, 432 A, DIG. 1, 73/160

[56] References Cited
UNITED STATES PATENTS 2,767,576  10/1956  Seney.................................... 73/144
3,403,553  10/1968  Wiener................................. 73/144

*Primary Examiner*—Jerry W. Myracle
*Attorney, Agent, or Firm*—Ross, Ross & Flavin

[57] ABSTRACT

Apparatus for measuring the tension in a length of yarn in a machine comprises deflecting means for deflecting said yarn and measuring means for measuring the force required to effect the deflection, which force is related to the tension in the yarn.

10 Claims, 3 Drawing Figures

YARN TENSION MEASURING

FIELD OF THE INVENTION

This invention relates to a method of an apparatus for measuring the tension in yarn, for example as it is processed in spinning, false twisting and other textile machines.

OBJECT OF THE INVENTION

An object of the invention is to provide improved apparatus, for measuring the tension in a length of yarn when it is being processed.

BRIEF STATEMENT OF THE INVENTION

Accordingly the invention provides apparatus for measuring the tension in yarn comprising deflecting means for deflecting the yarn measuring means for measuring the force required to effect the deflection.

The invention also provides a method of measuring the tension in yarn comprising deflecting the yarn and measuring the force required to effect the deflection.

Preferably the yarn is deflected to a constant desired configuration and the measuring means is electromagnetic.

When the yarn is deflected to a constant desired configuration, i.e., has a constant geometry when measurement is made, the force required to effect the deflection is linearly dependent upon the tension. The electromagnetic measuring means for measuring the force can conveniently include the deflecting means for applying the said force is linearly dependent upon the tension in the yarn.

The invention also provides a method of measuring the tension in a yarn comprising cyclically moving an element into contact with the yarn to deflect it and measuring the force necessary to effect such deflection over a plurality of cycles.

Preferably the said element is carried on a pivotable member. Conveniently the pivoted member is pivoted electromagnetically and the said force is measured by measuring the electrical power required to deflect the yarn.

Conveniently the member is an armature mounted between the poles of an electromagnet and carries two elements which contact the yarn from opposite sides. A coil of the electromagnet can be connected in an oscillator circuit of which a fixed contact and a contact on the armature form a part. A measurement of the electrical power taken by the circuit, for example measured by a volt meter connected in parallel with a resistance enables the tension in the yarn to be measured.

The invention still further provides apparatus for measuring the tension in a yarn comprising an element mounted for cyclic movement into contact with a yarn to deflect the yarn, cycling means for cyclically moving the element and measuring means for measuring the force necessary to deflect the yarn over a plurality of cycles.

Preferably the element is carried by a pivoted member and the cycling means is preferably electromagnetic, the measuring means being effective to measure the electrical power needed to move the element to deflect the yarn.

Conveniently the member is in the form of an armature pivotally mounted between the poles of an electromagnet and carries two elements which, upon movement of the armature, contact the yarn one on each side thereof.

A coil of the electromagnet, forming part of the cycling means, can be connected in an oscillator circuit which includes a fixed contact and a contact carried by the armature. The measuring means can include a volt meter connected in parallel with a resistor and operative to give a reading which is proportional to the force required to pivot the armature to deflect the yarn and hence proportional to the tension in the yarn.

BRIEF DESCRIPTION OF THE DRAWINGS

The invention will be described further, by way of example, with reference to the accompanying drawing wherein.

DESCRIPTION OF PREFERRED EMBODIMENTS

Figure 1:
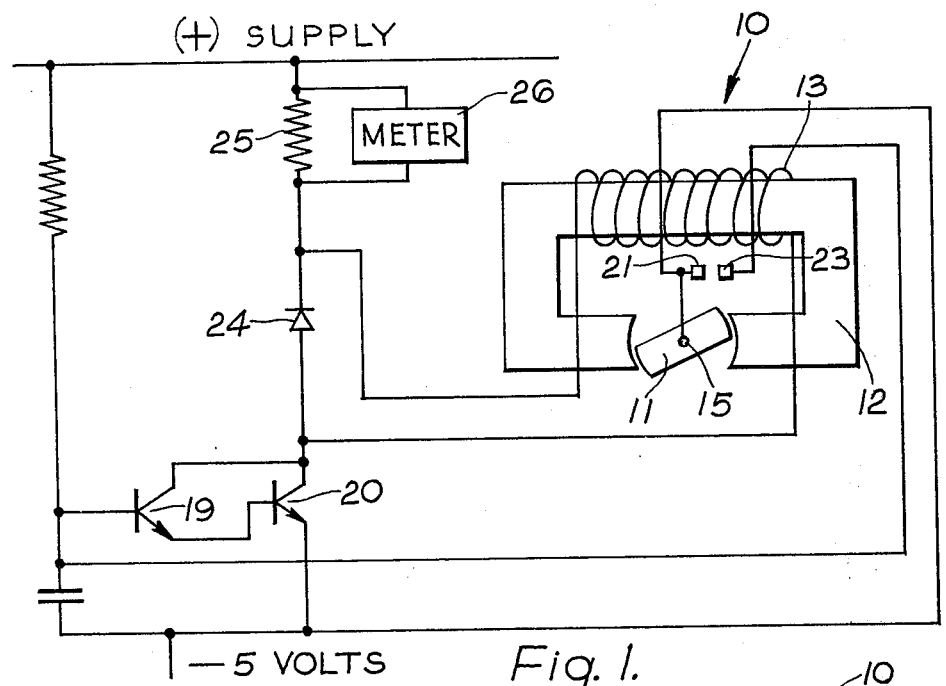
FIG. 1 is a schematic view of a preferred embodiment of apparatus conforming to the invention.
Figure 2:
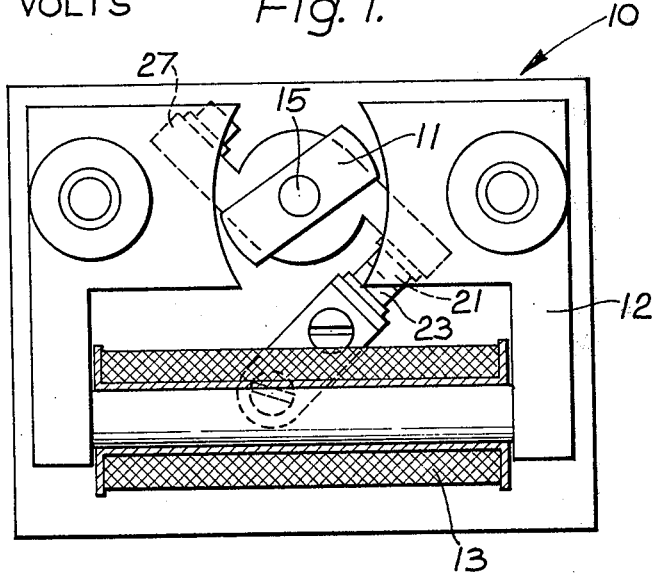
FIG. 2 is an enlarged view of an armature and electromagnet of the apparatus of FIG. 1.

In a first preferred embodiment of apparatus 10 conforming to the invention a core of an electromagnet 12 is made up from a number of silicon steel lamination and carries a coil 13 connected as shown. The coil 13, when energised, sets up a magnetic field spanning the inter polar gap which contains an armature in the form of a silicon steel rotor 11 fixed on a steel shaft 15 mounted in suitable bearings (not shown).

Figure 3:
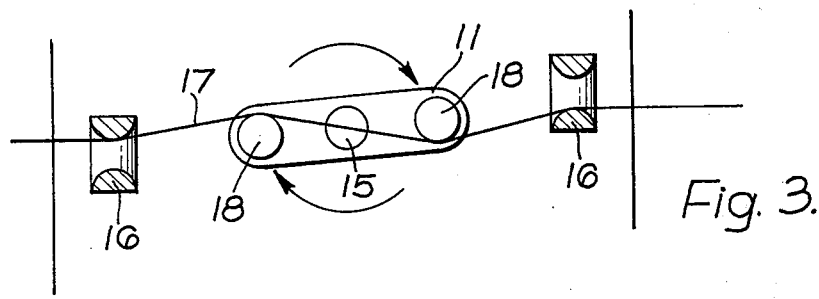
FIG. 3 is a schematic view of the yarn path through the apparatus of FIGS. 1 and 2.

FIG. 3 indicates the path of yarn 17 whose tension is to be measured. Referring to FIG. 3, ceramic guides 16 are mounted on the apparatus. The apparatus 10 is so located with respect to the yarn 17 that the yarn 17 lies just free of the guides 16, which really serve as location points when mounting the instrument thereby ensuring that the path of the yarn 17 between elements in the form of sensing guides 18 mounted on the rotor 11, is correct.

In the quiescent state, with the supply voltage removed, the rotor rests with the yarn running free of the guides 16. When the supply is turned on transistors 19 and 20 conduct and energise the coil 13. The electromagnetic flux produced causes the core 11 to turn towards the horizontal position (in the drawings) pushing the guides 18 against the yarn towards a position wherein the rotor 11 lies parallel to the flux across the poles. Before reaching this position, however, a contact 21, mounted on the rotor shaft 25, touches a fixed contact 23 clamping the base of transistor 19 to ground. Thus transistors 19 and 20 cease to conduct and the coil 13 is de-energised and the rotor 11 returns to its quiescent position. As this happens the contacts 21 and 22 separate and the process repeats. Thus the rotor 11 is operated in a vibrating mode. The current through the coil is quasi-continuous by virtue of the coil's inductance and the presence of the free-wheeling diode 24. This current is measured with the aid of a low valued resistor 25 (FIG. 1) connected in series with the coil 13. The volt drop across the resistor 25 is measured with a meter 26 modified to give a direct reading of the average value of the coil current, which is proportional to the tension of the yarn passing between the guides 16. To balance the rotating system a counter-weight in the form of a dummy contact 27 is provided.

The accuracy and reliability of the reading obtained from the apparatus are influenced greatly by stictional effects at the bearings holding the rotating system. By employing a vibrational mode of operation the effects of stiction can be nearly eliminated, without having to resort to expensive bearings.

A second preferred embodiment of apparatus (not illustrated) for measuring yarn tension, conforming to the invention, comprises a C-shaped electromagnet whose free ends are directed towards each other and are shaped to have end faces which are parts of a common cylinder. Mounted for pivotal movement about an axis coincident with the axis of said cylinder is an elongate armature of length just less than the diameter of said cylinder. The armature carries to spaced-apart rollers. Normally the armature is not aligned with the ends of the electromagnet and may be disposed at an angle of, say, 45° to a line joining the said ends. In this condition a run of yarn whose tension is to be measured can run freely between the rollers.

When it is desired to measure the tension in the yarn, which may be undergoing spinning, re-winding, false twisting or any other process, current is fed to the coil to cause a magnetic field to be generated which applies a force to the armature to line it up with the pole pieces. As this happens the rollers engage the yarn and the force required to deflect the armature will be dependent upon the tension in the yarn. Current in the coil is increased until the armature has pivoted sufficiently to contact a stop provided for this purpose. At this position the current is noted and is directly proportional to the tension in the yarn. After measurement the current is switched off and the armature returns to its initial position, for example under the influence of a weak spring. The tension can be measured periodically and because the yarn in each case is deflected to a position of constant geometry the force required to effect the deflection is direction proportional to the tension in the yarn. Thus the current flow necessary to extend that force is also linearly dependent upon the tension.

It is envisaged that the apparatus described will be used in a complete tension monitoring system for textile machines. One apparatus will be placed in the yarn path at each point on the machine where tension is a critical parameter. The apparatuses will have a common supply line and will be sequentially switched, for a short period, onto this line by a central control unit. A measurement will be made, at the control unit, of the current taken from the line as each unit is switched in. Thus a regular check on the tension at each critical point on the machine can be made.

The invention is not limited to the precise details of the foregoing and variations can be made thereto within the scope of the following claims. For example the element can be mounted on a rotatable member and the force needed to turn the member to deflect a yarn can be measured.

We claim:

1. A method of measuring the tension in yarn comprising, deflecting the yarn, measuring the force required to effect the deflection, with the yarn being deflected by means of a rotor situated between the poles of an electromagnet, the rotor carrying one or more measuring guides brought into contact with the yarn.

2. Apparatus for measuring the tension in yarn comprising, deflecting means for deflecting the yarn, measuring means for measuring the force required to deflect the yarn, the deflecting means comprising a rotor pivotally mounted between the poles of an electromagnet and carrying one or more deflecting guides for contacting the yarn.

3. Apparatus as claimed in claim 2 wherein the rotor carries two deflection guides.

4. Apparatus as claimed in claim 2, wherein the measuring means is capable of measuring the current consumed by a coil of the electromagnet.

5. Apparatus as claimed in claim 2, wherein the movement of the rotor is limited by a stop.

6. Apparatus as claimed in claim 5, wherein the rotor carries a movable contact which, when the rotor has moved through a certain angle, meets a fixed contact and is so effective to cut off power to the coil.

7. Apparatus as claimed in claim 6 wherein the measuring means includes a meter in parallel with a resistor which itself is in series with the coil.

8. A method of measuring the tension in a yarn comprising: cyclically moving an element into contact with the yarn to deflect it, measuring the force necessary to effect such deflection over a plurality of cycles, the said element being carried on a pivotable member pivoted electromagnetically, with the force being measured by measuring the electrical power required to deflect the yarn.

9. Apparatus for measuring the tension in a yarn comprising: an element mounted for cyclic movement into contact with a yarn to deflect the yarn, electromagnetic cycling means for cyclically moving the element, measuring means for measuring the force necessary to deflect the yarn over a plurality of cycles, the element being carried by a pivoted member, the measuring means being capable of measuring the average electrical power needed to move the element cyclically into contact with the yarn over the plurality of cycles.

10. Apparatus as claimed in claim 9, wherein the member is an armature mounted between the poles of an electromagnet having a coil connected in an oscillator circuit forming part of the cycling means and including a fixed contact and a contact carried by the armature.

* * * * *